United States Patent [19]

Fey et al.

[11] 4,160,118
[45] Jul. 3, 1979

[54] METHOD AND APPARATUS FOR SUPERHEATING GASES

[75] Inventors: Maurice G. Fey, Plum Boro; Charles B. Wolf, Irwin, both of Pa.

[73] Assignee: Westinghouse Electric Corp., Pittsburgh, Pa.

[21] Appl. No.: 881,350

[22] Filed: Feb. 27, 1978

Related U.S. Application Data

[62] Division of Ser. No. 837,655, Sep. 29, 1977.

[51] Int. Cl.² ............................ H05H 1/00; H05B 7/00
[52] U.S. Cl. ......................................................... 13/2 P
[58] Field of Search ................. 13/2, 2 P, 9; 204/164; 75/10 R, 134 S

[56] References Cited

U.S. PATENT DOCUMENTS

| | | | |
|---|---|---|---|
| 3,123,464 | 3/1964 | Casey et al. | 75/10 R |
| 4,080,194 | 3/1978 | Fey | 75/10 R |

Primary Examiner—R. N. Envall, Jr.
Attorney, Agent, or Firm—L. P. Johns

[57] ABSTRACT

An arc heater method and system for producing a high energy heat source characterized by a housing forming a mixing compartment, a plurality of arc heaters radially mounted on the housing and communicating with the mixing compartment, a reactor communicating with the downstream end of the mixing compartment with a reduced opening therebetween, inlet means at the downstream end of the compartment for introducing an oxidizable metal compound into the reactor, and means within the mixing compartment for flowing superheated gases from the arc heaters at the upstream end of the compartment and into the reactor.

7 Claims, 9 Drawing Figures

METHOD AND APPARATUS FOR SUPERHEATING GASES

This is a division, of application Ser. No. 837,655 filed Sept. 29, 1977.

BACKGROUND OF THE INVENTION

1. Field of the Invention

This invention relates to a mixing chamber for use with electric arc heaters for damping flow perturbations and vortices in heated gas streams to produce smooth flowing gas streams.

2. Description of the Prior Art

Many industrial processes require large volume streams of gaseous reactants to be heated to high temperatures in order to supply the thermal demands of particular processes. In general, it is desirable to supply the required energy without contaminating the reactant stream, and thus elaborate and generally complex heat exchange devices are frequently used. A typical example is a process for production of titanium dioxide pigment. For this endothermic reaction, titanium tetrachloride ($TiCl_4$) is heated to a temperature of about 1000° C. and combined with oxygen which is preheated to about 1200° C. The oxygen is heated in an externally fired heat exchanger to the maximum achievable temperature with state of the art materials. Inconel is typically used. Titanium tetrachloride, being corrosive at elevated temperatures, cannot be contained in conventional metals, and requires a very complex and delicate externally fired serpentine heat exchanger in which the $TiCl_4$ is contained in fused quartz tubing. Variations in flow and resultant pressure drop in the downstream reactor and coolant sections often produce acoustic waves which cause vibrations in the delicate quartz serpentine. Rupture occurs when the resonant frequency is reached, resulting in expensive maintenance and loss of production.

The titania industry has attempted many process variations to circumvent the problems, but each has significant disadvantages. Fuel oil has been admixed with the hot oxygen, thus reducing the temperature requirement for the $TiCl_4$ to a level suitable for conventional materials. Fuel combustion increases the mass requirement for oxygen substantially, and produces copious quantities of HCl upon reaction with the $TiCl_4$. The HCl is very corrosive to the downstream materials of construction and furthermore, it cannot be recycled for subsequent reuse.

Another process employs the combustion of carbon monoxide to provide the superheat energy, but it too suffers from increased costs of both oxygen and carbon monoxide. In another process, the oxygen is heated to temperatures of about 2000° C. by passing it through the discharge in a D.C. electric arc heater. This circumvents the need for the delicate quartz superheater for the $TiCl_4$ as the heat of reaction enters the process by superheat of the oxygen. The disadvantages of that process are limited production volume, employment of an expensive D.C. power system to supply the arc heater, and the geometry not being suitable for conversion of existing gas fired processes.

SUMMARY OF THE INVENTION

In accordance with this invention, it has been found that the disadvantages of some prior art procedures may be overcome by providing an arc heater system as a high energy heat source for producing metal oxides comprising a housing forming a mixing compartment with a plurality of arc heaters mounted substantially radially thereon at the upstream end. Each arc heater comprises a downstream electrode adjacent to the housing and an upstream electrode remote therefrom with a gap therebetween through which oxygen is introduced into the system to form an elongated arc heated oxygen stream. A reactor communicates with the downstream end of the housing. The housing comprises a refractory lining and includes axially extending vanes for directing the flow of gases longitudinally and devoid of vortices. The housing walls comprise cooling means whereby additional incoming oxygen is preliminarily passed through the cooling means and subsequently into the arc heated oxygen stream. Nozzle means are also provided in the mixing chamber for injecting abrasive particles longitudinally into the chamber toward the reactor for preventing the accumulation of reaction materials on the walls of the compartment and reactor. Conduit means between the mixing compartment and the reactor of a dimension less than those of the compartment are provided. Finally, inlet means for introducing an oxidizable metal compound into the reactor are provided at the upstream end thereof.

The advantage of this arc heater system is to provide superheated gases suitable for the production of clean oxides such as titania.

DESCRIPTION OF THE PREFERRED EMBODIMENTS

The process of this invention provides for the production of metal oxides by employment of high energy heat and comprises the steps of providing a polyphase arc heater system characterized by a number of arc heaters having arc chambers communicating with an elongated central mixing compartment; striking an electric arc in an axial gap between generally hollow cylindrical electrodes spaced along a common axis that form the arc chamber in each of the inner communicating arc heater chambers; directing oxygen through the gap into the arc chamber to thereby form an elongated arc heated oxygen stream; projecting the turbulent arc heated oxygen stream generally radially into the central mixing compartment; introducing a turbulent arc heated oxygen stream through the longitudinal channel means in the central mixing compartment to straighten the flow direction of the stream; introducing into the arc heated oxygen stream a halide of a metal selected from the group consisting of magnesium, aluminum, silicon, titanium, zirconium, hafnium, vanadium, niobium, tantalum, chromium, molybdenum, and tungsten, to form reaction products including an oxide of the metal and a halogen gas; directing particles of abrasive material longitudinally through the central mixing compartment and onto the downstream surfaces to prevent deposition of the reaction products thereon; and passing oxygen through channel means in the walls of the central mixing compartment in heat exchange relationship therewith and then passing the preheated oxygen into the elongated arc heated oxygen stream.

Figure 1:
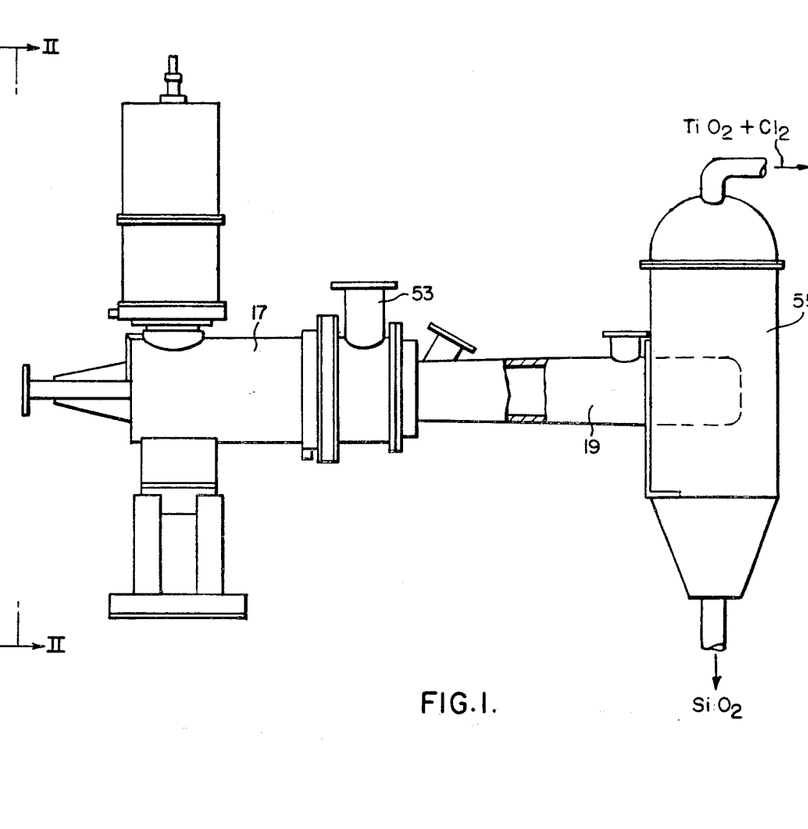
FIG. 1 is an elevational view of an arc heater system for producing a high energy heat source.
Figure 2:
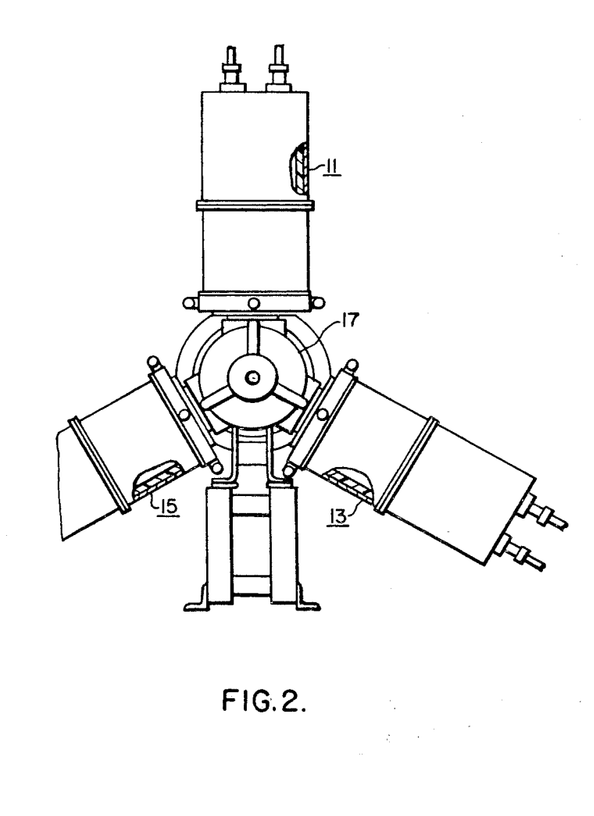
FIG. 2 is an end view taken on the line II—II of FIG. 1.

The process of this invention is preferably performed in an arc heater system indicated in the drawings. As shown in FIGS. 1 and 2, the arc heater system comprises a plurality, preferably three, arc heaters 11, 13, 15, a mixer 17, and a reactor 19. The embodiment of the system which overcomes the disadvantages of prior systems, has high production capability and employs a three phase A.C. power system comprising the arc heaters 11, 13, 15, which are three self-stabilizing electric arc heaters which supply the reaction energy by superheating oxygen. Each arc heater 11, 13, 15 is connected line-to-ground in a wye-connected three phase system. The arc heater 11 is typical of the arc heaters 11, 13, and 15 and is shown schematically in FIG. 3.

The arc heater 11 may be operated at a temperature ranging from about 1650° C. to about 5500° C. A suitable arc heater for use herein is that disclosed in U.S. Pat. No. 3,832,519, issued Aug. 27, 1974, entitled "Arc Heater With Internal Fluid and Electrical Duct and Quick Disconnect Facility" of which the inventors are Charles B. Wolf, Maurice G. Fey, and Frederick A. Azinger, Jr. Because of the full disclosure in that patent, the description of the arc heater 11 is limited herein to the basic structure in operation. The arc heater 11 is a single phase, self-stabilizing A.C. device capable of power levels up to about 3500 kilowatts or up to 10,000 kilowatts for a three phase plant installation. For the practice of this invention, it is preferred that three arc heaters be provided, one for each of the three phases of the A.C. power supply.

Figure 3:
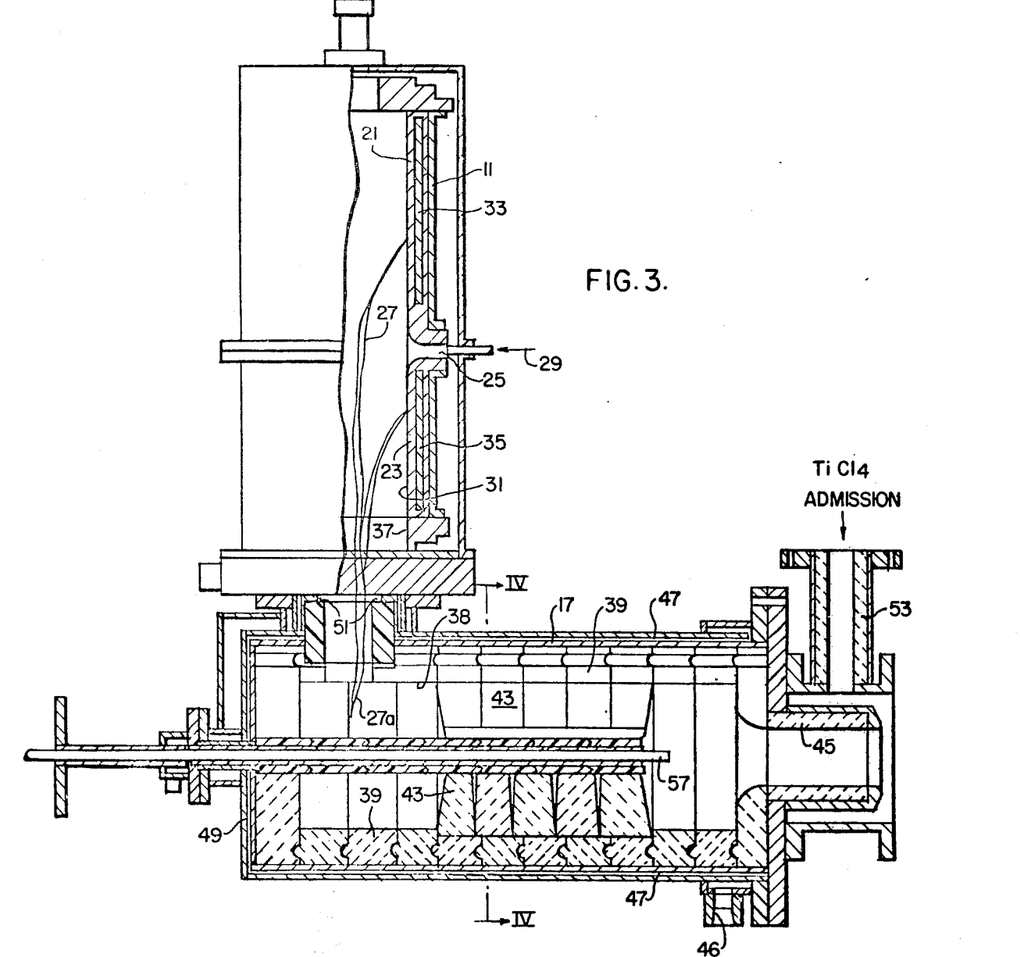
FIG. 3 is an enlarged sectional view of a portion of the arc heater system shown in FIG. 1.

As shown in FIG. 3, the arc heater 11 includes two annular copper electrodes 21, 23 which are spaced by a gap 25 about 1 millimeter wide to accommodate the line frequency power source of 4 kV. An arc is initiated in the space for gap 25, and incoming feed stock gas, such as oxygen, indicated by the arrow 29, is introduced through the gap into an arc chamber 31 within the interior of the arc heater 11. The arc 27 rotates at a speed of about 60,000 rpm by interaction between the arc current (several thousand amps A.C.) with a D.C. magnetic field set up by internally mounted solenoid coils 33, 35. The velocities generated yeild a very high operating efficiency for equipment of this type. Exit enthalpies ranging from, for example, up to about 15,000 BTU per pound are easily obtained at good thermal efficiencies at the downstream exit end 37 of the arc heater.

In operation, the arc heaters 11, 13, 15, provide an elongated arc stream 27a which extends through the exit end 37 of the arc heater into the mixer 17. The arc heaters 11, 13, 15 are physically located at 120° increments at the upstream end of the mixer 17 and fire the elongated arc stream 27a radially inward into a central mixing compartment contained within a refractory lining 39. This serves to dampen the temperature perturbations of the three alternating power waves. Vortices are removed from this stream by passing it through longitudinal passages 41 (FIG. 4) formed by longitudinally extending vanes 43 which vanes extend radially from the center of the compartment to the refractory lining 39. Thus, the vanes 43 serve as an internal flow straightener for the oxygen gas stream flowing downstream (to the right as viewed in FIG. 3) at the downstream end of the mixer 17, a passage 45 having a diameter less than that of the mixing chamber 38 is provided to accelerate the axially flowing gas stram to the required velocity as the gas stream enters the reactor 19. There the oxygen gas stream contacts a radially directed stream of a metal compound, such as titanium tetrachloride, and reacts to form a metal oxide, namely, titanium dioxide.

Structurally, the walls of the mixing chamber are made of a suitable high temperature material, such as stabilized zirconium oxide, with which is operated at internal surface temperatures of up to about 2500° C. It is recognized that other materials may also be used, such as thorium oxide, magnesium oxide, zirconium diboride, magnesium chromate, and lanthanum chromate. Heat lost by conduction through the walls is partially recovered by incoming oxygen which is introduced at an inlet 46 which communicates with interconnecting passage means 47, 49 that lead to oxygen nozzle 51 where the heated oxygen is injected into the arc stream 27a. Thus, the preheated oxygen stream is internally manifold to the process stream at the exit flanges of each of the arc heaters. Adjustment of the relative oxygen flows entering the two locations, that is at the gap 25 and the nozzle 51, is a means for temperature control of the oxygen stream.

The reactor 19 is a tubular container, the upstream end of which is attached to the downstream end of the mixer 17. Oxidizable compounds of metals, such as for example, titanium, zirconium, hafnium, magnesium and aluminum, are introduced into the reactor 19 through an inlet 53 between the mixer 17 and the reactor 19 (FIGS. 1 and 3). Upon entering the reactor chamber, the oxidizable metal compound, such as titanium tetrachloride, reacts with the hot oxygen gases entering the reactor in accordance with the following formula:

$$TiCl_4 + O_2 \rightarrow TiO_2 + 2Cl_2$$

In the reactor 19, the reaction temperature varies from about 1600° to 2300° C. The reaction products including titanium dioxide and chlorine gas move from the reactor into a cyclone separator 55 where the titanium dioxide, being very fine particles, exits the system with the chlorine gas.

Figure 4:
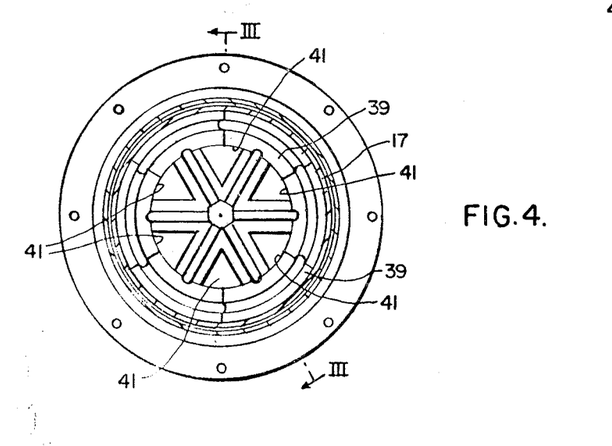
FIG. 4 is a vertical sectional view taken on the line IV—IV of FIG. 3.

As shown in FIGS. 3 and 4, particles of an abrasive material such as sand are introduced through a conduit 57 which is axially disposed in the mixer 17. The inner right end of the conduit is directed toward the passage 45 so that the particles of sand are projected against the surfaces of the passage and of the reactor 19 in order to keep the surfaces free from accumulation of reaction materials and products and thereby maintain an efficient reaction procedure. The sand is ultimately separated from the reaction products (FIG. 1) in the cyclone separator 55.

Figure 5:
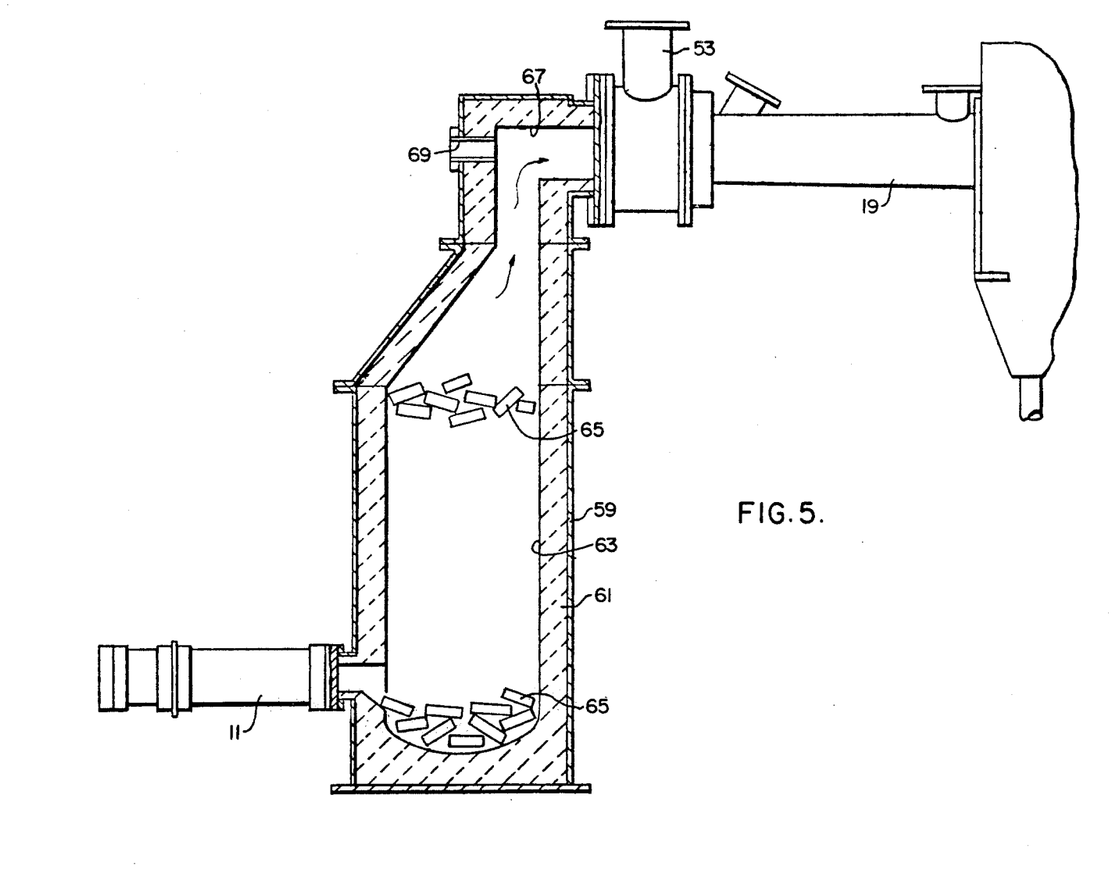
FIG. 5 is a vertical sectional view of another embodiment of the arc heater system.

Another embodiment of the invention is shown in FIG. 5 in which parts with reference numbers similar to those of the system of FIGS. 1, 2 and 3 are similarly identified. More particularly, in FIG. 5, one arc heater 11 is shown though it is understood that two additional arc heaters similar to the arc heaters 13 and 15 (FIG. 2) are included. The arc heaters direct hot oxygen streams into a mixer 59 having a refractory lining 61 similar to the lining 39. A mixing chamber 63 formed by the lining 61 is filled with refractory bodies 65, such as bricks which contribute to the gas mixing in the chamber.

More particularly, the three arc heaters 11, 13, and 15 operating at different cycles of the A.C. power source operate at slightly different temperatures so that oxygen introduced into the mixer 59 by each arc heater has a temperature different from the oxygen introduced in the other two arc heaters. By providing the bricks 65 in the mixing chamber 63, the gases become thoroughly mixed and achieve a uniform temperature as mixed gases rise through the top of the mixer 59. As the gas leaves the mixer 59, it enters a conduit 67 of a diameter less than that of the mixing chamber 63 from where it is directed into the reactor 19 in a manner similar to that of the system of FIG. 1. An inlet 69 is provided for injection of particles of abrasive material such as sand which is necessary to prevent reaction products from accumulating on the walls of the reactor 19. Manifestly, the inlet 53 between the conduit 67 and the reactor 19 introduces an oxidizable compound of a metal which is converted to the metal oxide in the reactor 19. The reaction products, such as titanium dioxide and chlorine gas, upon leaving the reactor 19 are directed into a cyclone separator similar to that shown in FIG. 1 in order to separate the reaction products from the sand.

Figure 6:
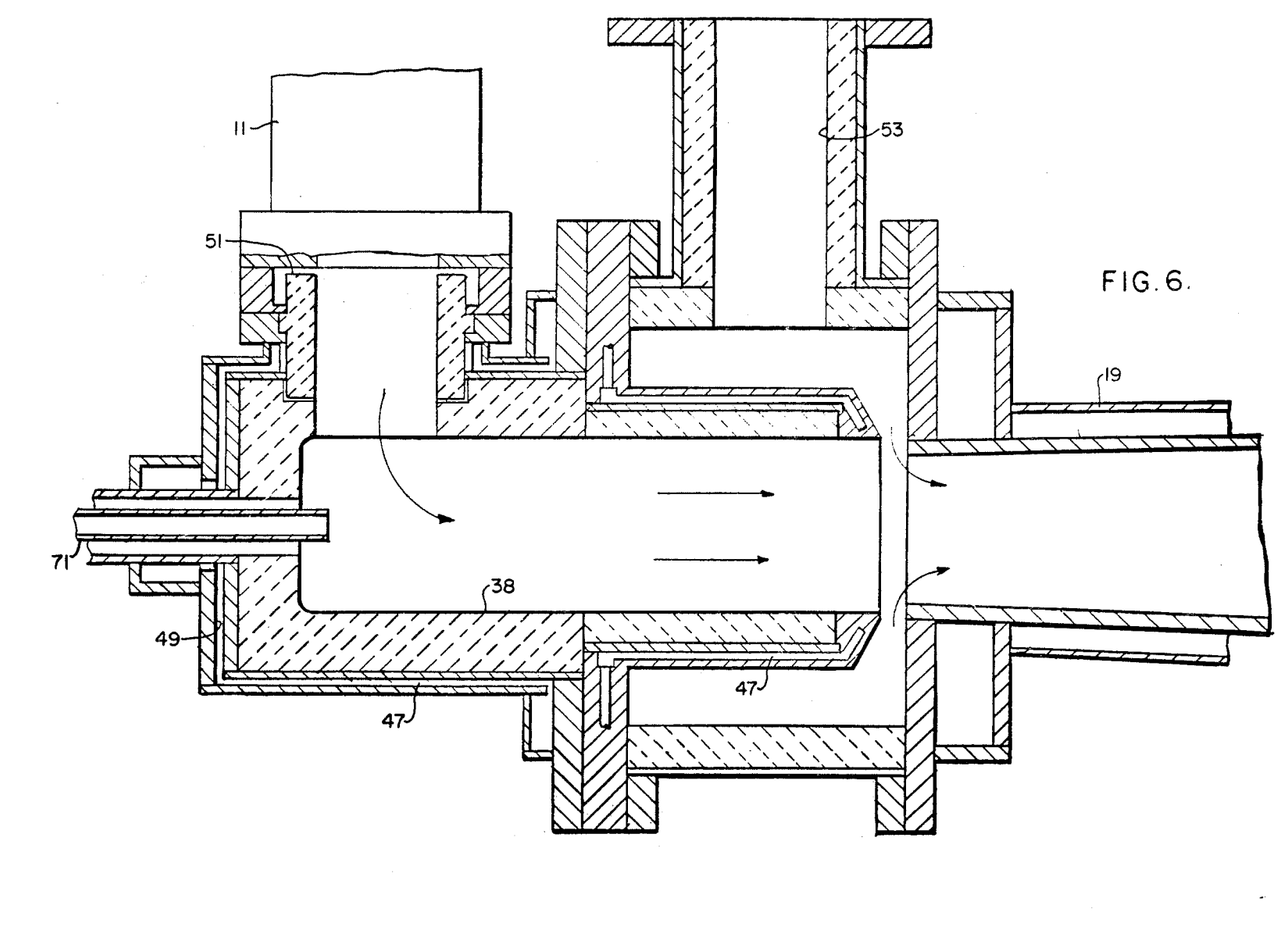
FIGS. 6, 7, and 8 are enlarged sectional views of other embodiments of the arc heater system.

Another embodiment of the invention is shown in FIG. 6 in which similar parts are provided with similar reference numbers as those of prior embodiments. In this embodiment, the mixture chamber 38 is devoid of longitudinal vanes 43 as provided in the first embodiment (FIG. 3). In addition, the downstream end of the chamber communicates directly with the reactor with the omission of a reduced passage 45 as shown in FIG. 3. Finally, a conduit 71 for the injection of particles of an abrasive material such as sand extends only slightly into the upstream end of the mixture chamber 38 thereby enabling the projection of sand onto the surface of the mixing chamber 38.

Figure 7:
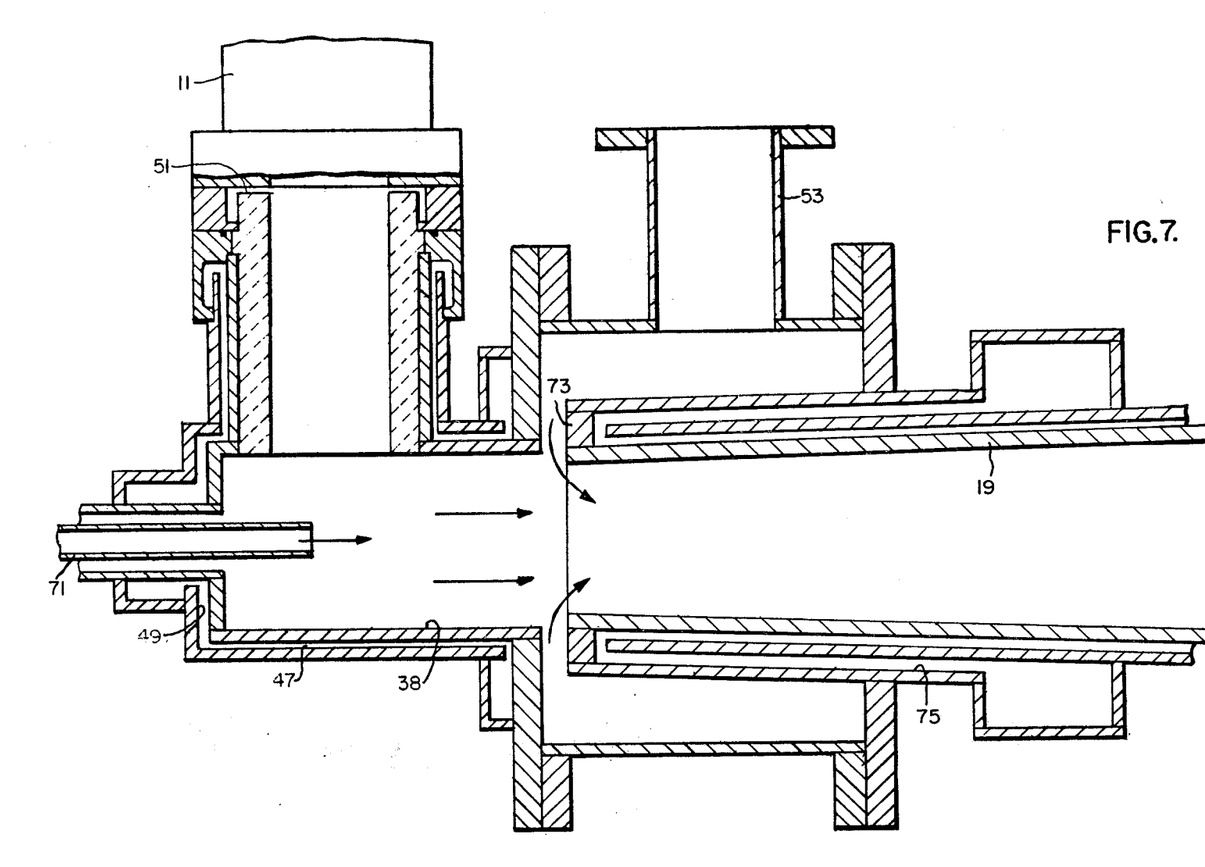

In another embodiment of the invention shown in FIG. 7, the mixing chamber 38 is substantially shorter than those of the previous embodiments and the inlet 53 for the introduction of oxidizable compounds of a metal such as titanium tetrachloride as an inner inlet 73 upstream of the inlet 53, whereby the metal compound is in immediate contact with the heated oxygen leaving the mixing compartment 38. Finally the reactor 19 is provided with a water jacket 75.

Figure 8:
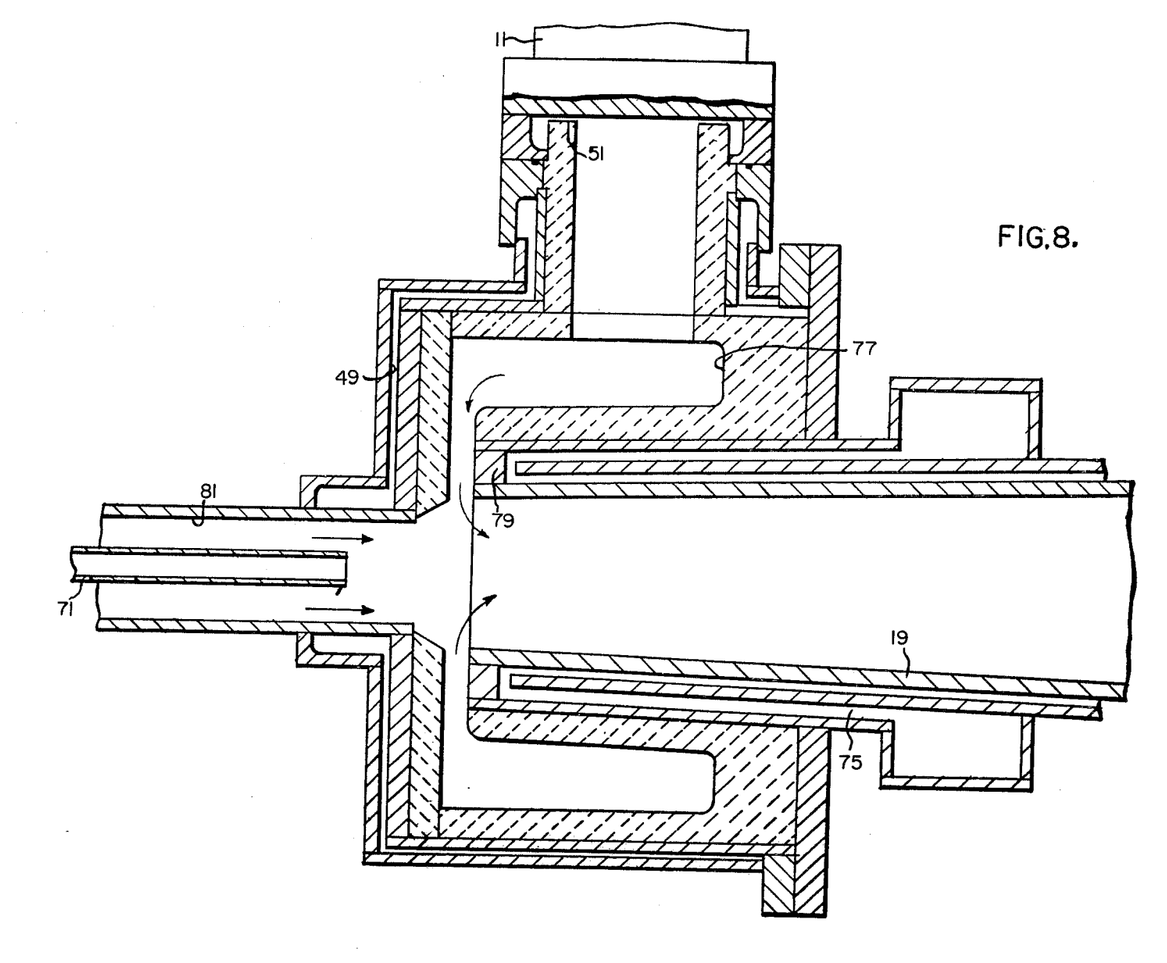

Finally, another embodiment is shown in FIG. 8 in which heated oxygen issuing from the arc heaters 11, 13, 15 is delivered into an annular plenum chamber 77 from where it exits through outlet means 79 directly into the reactor 19. An oxidizable compound of a metal such as titanium tetrachloride is introduced into the reactor upstream of the outlet means 79 for oxygen through a conduit 81 surrounding the conduit 71 for the introduction of particles of abrasive material such as sand.

Figure 9:
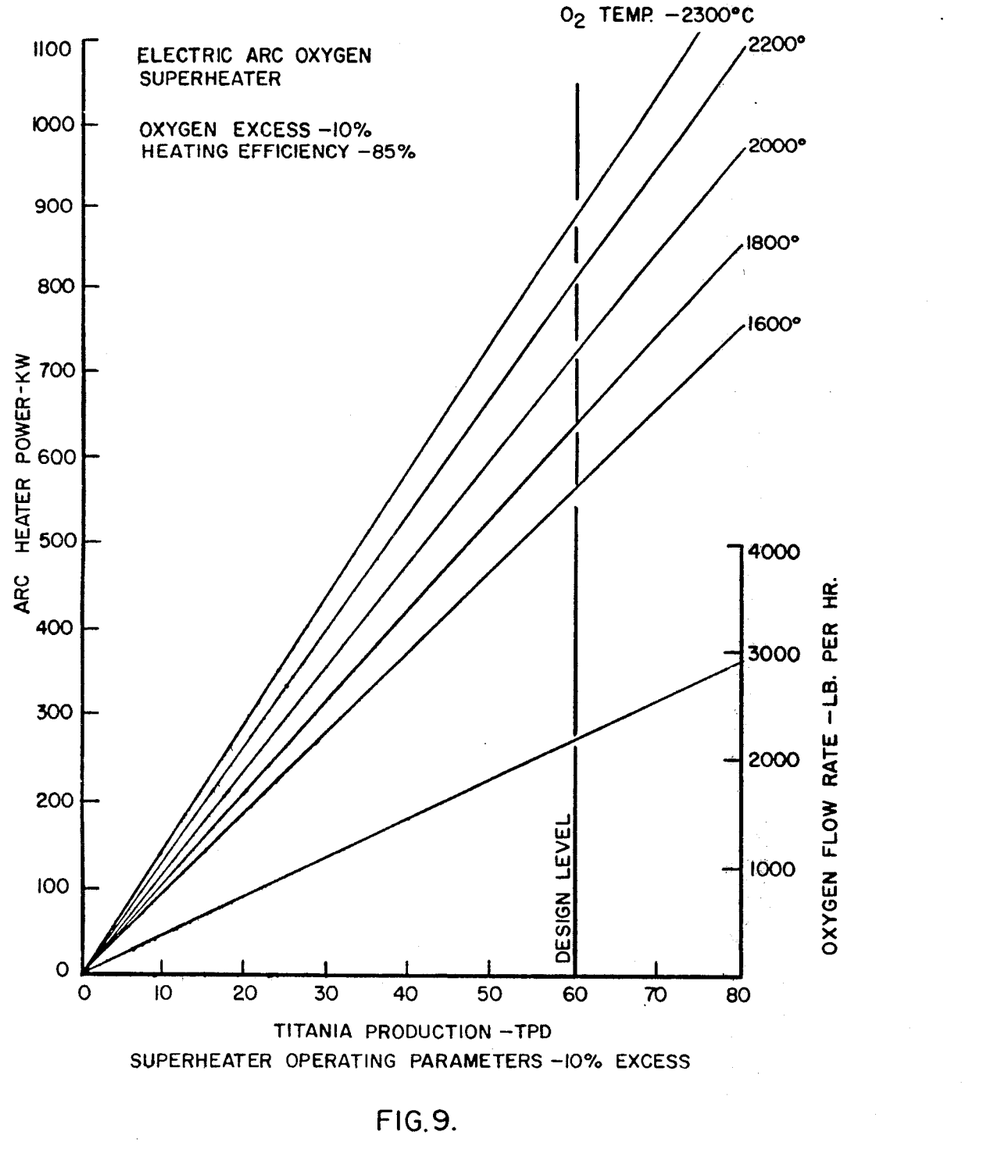
FIG. 9 is a graph showing operating parameters of the arc heater system for titania production.

The operating parameters of the gas superheater of this invention for the production of titania are shown in FIG. 9. For an expected production volume of 60 tons per day of $TiO_2$, an arc heater power of 900 kW will be required at 85% thermal efficiency and for a stoichiometric oxygen excess of 10%. Manifestly, the gas superheater of this invention may be used for heating gases for a wide range of purposes and not simply limited to heating oxygen for the production of pure oxides such as titania. For example, steam may be heated for pyrolysis of hydrocarbons to produce products such as ethylene and propylene. Nitrogen could be heated for the production of nitrides such as boron nitride.

What is claimed is:

1. An arc heater system as a high energy heat source for producing metal oxide, comprising a housing forming a mixing compartment, a plurality of arc heaters mounted on the housing and extending substantially radially thereon, each arc heater comprising a downstream electrode adjacent to the housing and an upstream electrode remote therefrom, the upstream and downstream electrodes having a gap therebetween, each arc heater having an arc chamber communicating with the compartment, a reactor communicating with the downstream end of the mixing compartment, inlet means at the downstream end of the compartment for introducing an oxidizable metal compound into the reactor, and the reactor being axially aligned with the compartment.

2. The arc heater system of claim 1 in which nozzle means are provided in the mixing compartment for injecting abrasive particles longitudinally toward the reactor, thereby preventing accumulation of reaction materials on the walls of the mixing compartment and reactor.

3. The arc heater system of claim 2 in which axially extending means are provided in the mixing compartment for flowing reaction gases from the arc heaters longitudinally to the reactor.

4. The arc heater system of claim 3 in which the walls of the mixing compartment are a refractory material selected from the group consisting of zirconium oxide, thorium oxide, magnesium oxide, zirconium boride, magnesium chromate, and lanthanum chromate.

5. The arc heater system of claim 4 in which axially extending means are radial vanes of refractory material corresponding to the walls.

6. The arc heater system of claim 5 in which the nozzle means is axially disposed in the mixing compartment and extends over a greater length thereof.

7. The arc heater system of claim 6 in which an opening extends between the mixing compartment and the reactor and has a diameter less than that of the compartment and has an axis aligned with that of the compartment.

* * * * *